United States Patent
Rofougaran

(10) Patent No.: US 8,068,794 B2
(45) Date of Patent: Nov. 29, 2011

(54) METHOD AND SYSTEM FOR A MULTISYSTEM POLAR TRANSMITTER

(75) Inventor: Ahmadreza Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 801 days.

(21) Appl. No.: 11/680,236

(22) Filed: Feb. 28, 2007

(65) Prior Publication Data

US 2008/0207139 A1    Aug. 28, 2008

(51) Int. Cl.
*H04B 1/40* (2006.01)
*H04B 1/02* (2006.01)
*H04B 1/66* (2006.01)
*H04L 27/00* (2006.01)

(52) U.S. Cl. .......... 455/102; 455/76; 455/91; 375/295; 375/299

(58) Field of Classification Search .......... 455/41.2, 455/76, 91, 102, 103, 165.1, 183.1, 260, 455/500, 561; 375/295, 299
See application file for complete search history.

(56) References Cited

U.S. PATENT DOCUMENTS

| | | | |
|---|---|---|---|
| 6,924,711 B2 * | 8/2005 | Liu | 332/159 |
| 7,110,731 B2 * | 9/2006 | Derome et al. | 455/127.4 |
| 7,532,679 B2 * | 5/2009 | Staszewski et al. | 375/295 |
| 2002/0150169 A1 * | 10/2002 | Kishi | 375/295 |
| 2005/0003785 A1 * | 1/2005 | Jackson et al. | 455/260 |
| 2005/0090208 A1 * | 4/2005 | Liao | 455/112 |
| 2005/0266818 A1 * | 12/2005 | Johnson et al. | 455/260 |
| 2006/0160492 A1 * | 7/2006 | Jensen | 455/76 |
| 2006/0222102 A1 * | 10/2006 | Kadota | 375/295 |
| 2007/0087702 A1 * | 4/2007 | Kato et al. | 455/102 |
| 2008/0205549 A1 * | 8/2008 | Rofougaran | 375/299 |

* cited by examiner

*Primary Examiner* — Andrew Wendell
(74) *Attorney, Agent, or Firm* — McAndrews, Held & Malloy, Ltd.

(57) ABSTRACT

Aspects of a method and system for a Multisystem Polar Transmitter may include a single integrated circuit comprising one or more Direct Digital Frequency Synthesizer (DDFS). The single integrated circuit may generate a plurality of signals compliant with at least a first wireless protocol and a second wireless protocol. At least one of the plurality of signals is polar modulated using the DDFS. The single integrated circuit may comprise a plurality of wireless transmitters. In another embodiment of the invention, a plurality of baseband signals compliant with the first and second protocols may be combined. The first protocol may be Bluetooth® and the second protocol may be Wireless LAN. The combined plurality of baseband signals may be modulated via a single wireless transmitter on the integrated circuit. The phase and frequency for polar modulation may be adjusted using the DDFS, while the amplitude may be adjusted using an amplifier.

21 Claims, 4 Drawing Sheets

METHOD AND SYSTEM FOR A MULTISYSTEM POLAR TRANSMITTER

CROSS-REFERENCE TO RELATED APPLICATIONS/INCORPORATION BY REFERENCE

This application makes reference to:

U.S. application Ser. No. 11/680,044, filed on even date herewith;

U.S. application Ser. No. 11/680,165, filed on even date herewith;

U.S. application Ser. No. 11/680,176, filed on even date herewith;

U.S. application Ser. No. 11/680,188, filed on even date herewith;

U.S. application Ser. No. 11/680,253, filed on even date herewith; and

U.S. application Ser. No. 11/680,370, filed on even date herewith.

FIELD OF THE INVENTION

Certain embodiments of the invention relate to signal processing for communication systems. More specifically, certain embodiments of the invention relate to a method and system for a Multisystem Polar Transmitter.

BACKGROUND OF THE INVENTION

A Direct Digital Frequency Synthesizer (DDFS) is a digitally-controlled signal generator that may vary the output signal frequency over a large range of frequencies, based on a single fixed-frequency precision reference clock. In addition, a DDFS is also phase-tunable. In essence, within the DDFS, discrete amplitude levels are fed to a Digital-to-Analog Converter (DAC) at a sampling rate determined by the fixed-frequency reference clock. The output of the DDFS provides a signal whose shape depends on the sequence of discrete amplitude levels that are fed to the DAC at the constant sampling rate. The DDFS is particularly well suited as a frequency generator that outputs a sine or other periodic waveforms over a large range of frequencies, from almost DC to approximately half the fixed-frequency reference clock frequency.

A DDFS offers a larger range of operating frequencies and requires no feedback loop, thereby providing near instantaneous phase- and frequency changes, avoiding over- and undershooting and settling time issues associated with another analog systems. A DDFS may provide precise digitally-controlled frequency and/or phase changes without signal discontinuities.

Polar Modulation is related to inphase (I) and quadrature (Q) modulation in the same way that polar coordinates are related to the Cartesian coordinate system. For polar modulation, the orthogonal I and Q components of an RF signal are converted to a phasor representation comprising an amplitude component and a phase component. In this way, the combined I and Q signal may be generated with one phase change and one amplitude change, whereas separate I and Q modulation may require amplitude and phase modulation for each channel, especially for non-constant envelope modulation modes. In addition, the I and Q modulation approach may require good linearity of the power amplifier, often leading to power inefficient designs that suffer from parameter variability due to factors such as temperature. In contrast, polar modulation may allow the use of very efficient and non-linear amplifier designs for non-constant envelope modulation schemes.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a Multisystem Polar Transmitter, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a Multisystem Polar Transmitter. Aspects of a method and system for a Multisystem Polar Transmitter may include in a single integrated circuit comprising one or more Direct Digital Frequency Synthesizer (DDFS) and one or more circuits that processes one or more signals compliant with at least a first wireless protocol and a second wireless protocol for transmission, may generate a plurality of signals compliant with at least the first wireless protocol and the second wireless protocol, wherein at least one of the signals is polar modulated using the DDFS. One or more circuits may comprise a plurality of wireless transmitters. The plurality of wireless transmitters may comprise a Bluetooth® transmitter and a Wireless LAN transmitter. In another embodiment of the invention, a plurality of baseband signals compliant with the first and second protocol, respectively, may be combined. The first protocol may be Bluetooth® and the second protocol may be Wireless LAN. The combined plurality of baseband signals may be modulated via a single wireless transmitter on the integrated circuit. The phase and frequency for polar modulation may be adjusted using the DDFS, while the amplitude for polar modulation may be adjusted using a variable-gain power amplifier.

Figure 1A:
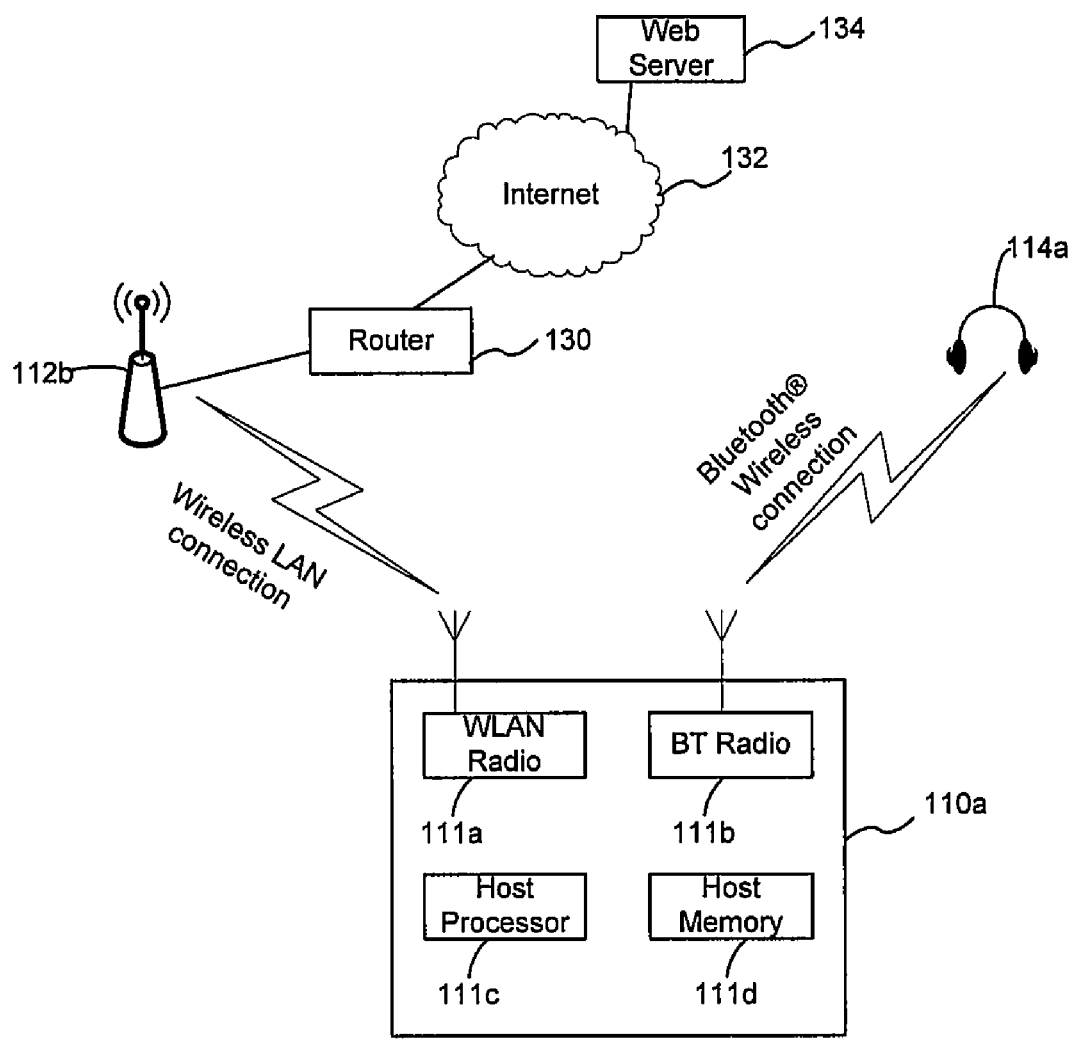
FIG. 1A is a diagram illustrating an exemplary WLAN and Bluetooth® wireless communication system, in connection with an embodiment of the invention.

FIG. 1A is a diagram illustrating an exemplary WLAN and Bluetooth® wireless communication system, in connection with an embodiment of the invention. Referring to FIG. 1, there is shown a WLAN access point 112b, a computer 110a, a Bluetooth® headset 114a, a router 130, the Internet 132 and a web server 134. The computer or host device 110a may comprise a wireless LAN (WLAN) radio 111a, a Bluetooth® radio 111b, a host processor 111c, and a host memory 111d. There is also shown a Wireless LAN (WLAN) connection between the wireless LAN radio 111a and the wireless LAN access point 112b, and a Bluetooth® wireless connection between the Bluetooth® radio 111b and the Bluetooth® headset 114a.

Frequently, computing and communication devices may comprise hardware and software to communicate using multiple wireless communication standards. The WLAN radio 111a may be compliant with IEEE 802.11 standard. There may be instances when the WLAN radio 111a and the Bluetooth® radio 111b are active concurrently. For example, it may be desirable for a user of the computer or host device 110a to access the Internet 132 in order to consume streaming content from the Web server 134. Accordingly, the user may establish a WLAN connection between the computer 110a and the access point 112b. Once this connection is established, the streaming content from the Web server 134 may be received via the router 130, the access point 112b, and the WLAN connection, and consumed by the computer or host device 110a.

It may be further desirable for the user of the computer 110a to listen to an audio portion of the streaming content on the Bluetooth® headset 114a. Accordingly, the user of the computer 110a may establish a Bluetooth® wireless connection with the Bluetooth® headset 114a. Once the Bluetooth® wireless connection is established, and with suitable configurations on the computer enabled, the audio portion of the streaming content may be consumed by the Bluetooth® headset 114a.

Figure 1B:
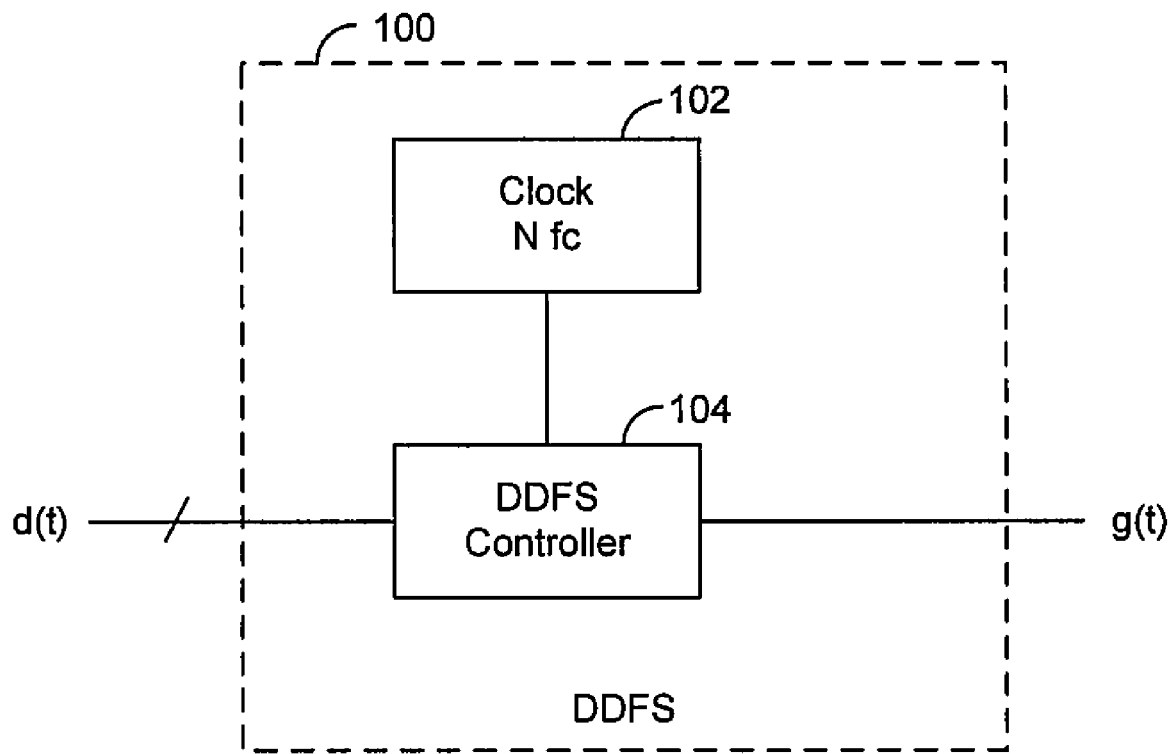
FIG. 1B is a block diagram illustrating a Direct Digital Frequency Synthesizer (DDFS), in connection with an embodiment of the invention.

FIG. 1B is a block diagram illustrating an exemplary Direct Digital Frequency Synthesizer (DDFS), in connection with an embodiment of the invention. Referring to FIG. 1B, there is shown a DDFS 100, a clock 102 and a DDFS controller 104. There is also shown a digital input signal d(t) and an analog output signal g(t).

The DDFS 100 may be a digitally-controlled signal generator that may vary the analog output signal g(t) over a large range of frequencies, based on a single fixed-frequency precision reference clock, which may be clock 102. In addition, the DDFS 100 is also phase-tunable. The digital input signal d(t) may comprise control information about the frequency and/or phase of the analog output signal g(t) that may be generated as a function of the digital input signal d(t). The clock 102 may provide a reference clock that may be N times higher than the frequency fc that may be generated at the output signal g(t). Using the clock 102 and the information that may be contained in the digital input signal d(t), the DDFS controller 104 may generate a variable frequency analog output signal g(t).

Figure 2:
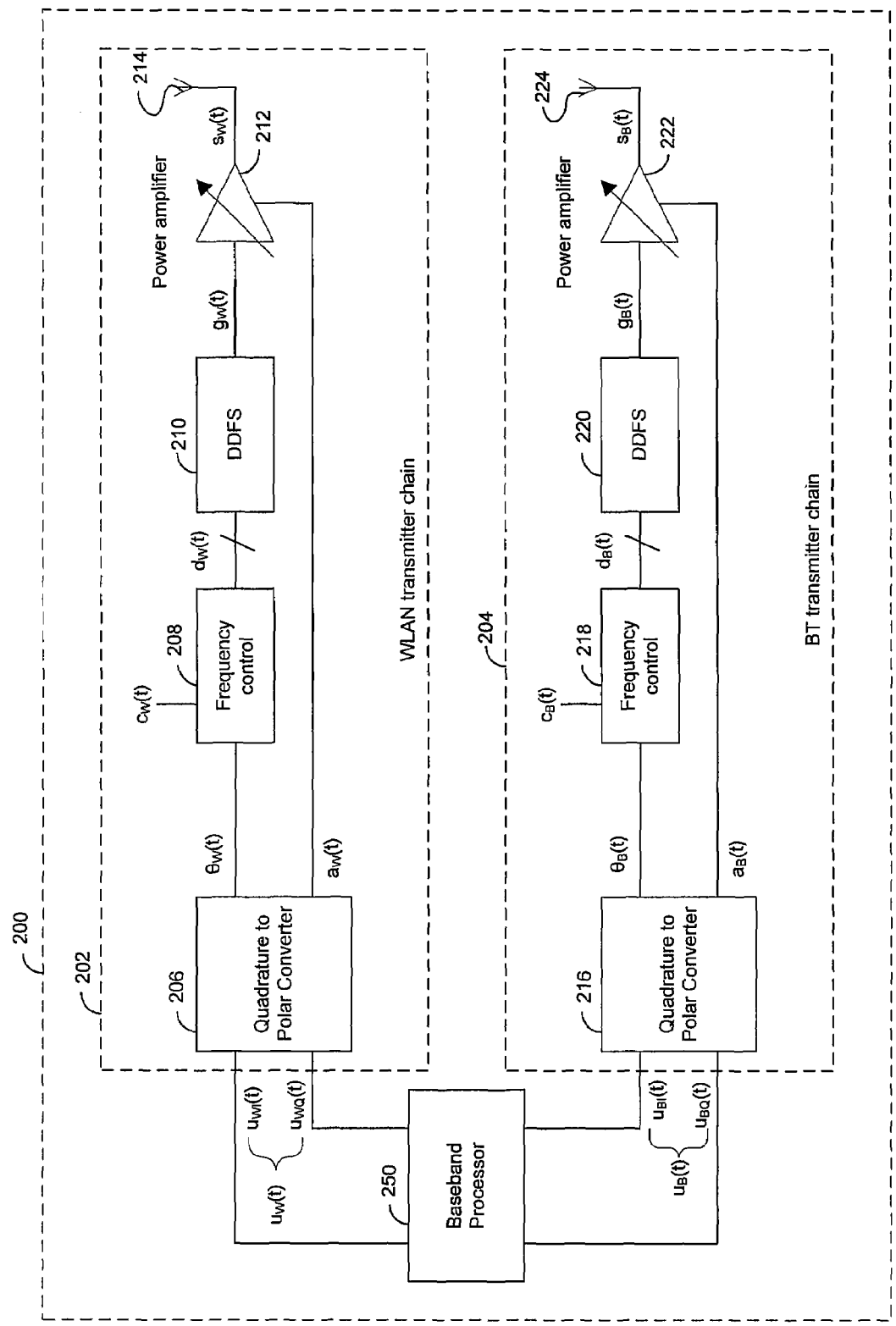
FIG. 2 is a block diagram illustrating an exemplary multisystem polar transmission system using DDFS, in accordance with an embodiment of the invention.

FIG. 2 is a block diagram illustrating an exemplary multisystem polar transmission system using DDFS, in accordance with an embodiment of the invention. Referring to FIG. 2, there is shown a multisystem polar transmission system 200, comprising a baseband processor 250, a Wireless Local Area Network (WLAN) transmitter chain 202 and a Bluetooth® (BT) transmitter chain 204. The WLAN transmitter chain 202 may comprise a Quadrature-to-Polar (Q2P) converter 206, a frequency control block 208, a DDFS 210, a power amplifier 212 and an antenna 214. There is also shown a complex envelope signal $u_W(t)=u_{WI}(t)+j\ u_{WQ}(t)$, comprising an inphase component $u_{WI}(t)$ and a quadrature component $u_{WQ}(t)$, a phase $\theta_W(t)$, an amplitude $a_W(t)$, a frequency control signal $c_W(t)$, a digital DDFS control signal $d_W(t)$, a DDFS output signal $g_W(t)$, and a transmit signal $s_W(t)$. The BT transmitter chain 204 may comprise a Quadrature-to-Polar (Q2P) converter 216, a frequency control block 218, a DDFS 220, a power amplifier 222 and an antenna 224. There is also shown a complex envelope signal $u_B(t)=u_{BI}(t)+j\ u_{BQ}(t)$, comprising an inphase component $U_{BI}(t)$ and a quadrature component $u_{BQ}(t)$, a phase $\theta_B(t)$, an amplitude $a_B(t)$, a frequency control signal $c_B(t)$, a digital DDFS control signal $d_B(t)$, a DDFS output signal $g_B(t)$, and a transmit signal $s_B(t)$.

The baseband processor 250 of a multisystem polar transmission system 200 may comprise suitable logic, circuitry and/or code that may be enabled to generate baseband signals for a plurality of wireless communication systems. In another embodiment of the invention, multisystem polar transmission system 200 may comprise multiple functional blocks that may together offer the functionality of baseband processor 250.

Some WLAN communication systems may process and modulate the quadrature component $u_{WQ}(t)$ and the inphase component $u_{WI}(t)$ of the complex envelope $u_W(t)$ separately. For non-constant envelope modulation methods, however, it may be useful to use polar modulation in conjunction with DDFS. Polar modulation may allow combining the inphase and quadrature components such that amplitude modulation and phase modulation for the complex envelope may be achieved by phase modulation followed by amplitude modulation or vice versa. The ability to sequentially modulate amplitude and phase may avoid a need for high quality linear power amplifiers as may be desirable in more common inphase and quadrature modulation, in particular for non-constant envelope modulation.

Due to modern semiconductor manufacturing methods that may permit ever increasing processing speeds, the DDFS may be able to modulate a signal directly from baseband to radio frequency without modulating to intermediate frequency first. For example, 45 nm and smaller semiconductor processes may be able to operate DDFS at frequencies of 60 GHz and higher. The DDFS may also be able to achieve near instantaneous frequency and phase shifts over a large frequency range while maintaining a phase-continuous signal. This may make this approach particularly appropriate for polar modulation of frequency-hopping signals like, for example, Orthogonal Frequency Division Multiplexing (OFDM).

In order to use polar modulation, the complex envelope signal $u_W(t)$, which may also be referred to as complex lowpass equivalent signal, may be converted into polar form in the Q2P converter 206. The phase $\theta_W(t)$ and the amplitude $a_W(t)$ may be obtained from $u_W(t)$ through the following relationships:

$$a_W(t) = \sqrt{u_{WI}^2(t) + u_{WQ}^2(t)}$$

and $$\theta_W(t) = \tan^{-1}\left(\frac{u_{WQ}(t)}{u_{WI}(t)}\right)$$

So that $u_W(t)=a_W(t)e^{j\theta_W(t)}$. The transmitted signal, after frequency modulation may be given by the following relationship:

$$s_W(t)=Re\{u_W(t)e^{j2\pi f_{CW}(t)t}\}=a_W(t)\cos(2\pi f_{CW}(t)t+\theta_W(t)) \quad (1)$$

where $f_{CW}(t)=c(t)f_W$ may be a time-varying carrier. The frequency $f_{CW}(t)$ may be time varying, for example, because of frequency hopping, and the frequency hopping sequence may be controlled by the frequency control signal $c_W(t)$. The frequency $f_W$ may be a constant frequency. In the manner shown in equation (1), the modulation of the complex envelope signal $u_W(t)$ may be achieved in a step comprising carrier and phase modulation and another step comprising amplitude modulation. The carrier and phase modulation may be achieved in DDFS 210 and the amplitude modulation in power amplifier 212.

The frequency control block 208 may take as inputs the phase $\theta_W(t)$ and the frequency control signal $c_W(t)$. The frequency control block 208 may generate a digital signal $d_W(t)$ that may feed the DDFS and may provide the information about the phase $\theta_W(t)$ and the frequency control signal $c_W(t)$ to the DDFS in a digital format so that the DDFS 210 may generate the analog output signal $g_W(t)$, where $$g_W(t)=\cos(2\pi f_{CW}(t)t+\theta_W(t))$$

The power amplifier 212 may perform amplitude modulation on the signal $g_W(t)$ to generate the transmit signal $s_W(t)$, where $$s_W(t)=a_W(t)g_W(t)$$

The signal $s_W(t)$ may then be transmitted via antenna 214.

The BT transmitter chain 204 may function in a method similar to the WLAN transmitter chain 202. A multisystem polar transmission system as shown in FIG. 2 may comprise multiple transmitter chains for multiple transmission technologies. For example, there may be a WLAN transmitter chain 202 and a BT transmitter chain 204 as depicted. The number of transmitter chains and the wireless transmission technologies and/or standards may be arbitrary. Use of a DDFS may permit a wider range of operating frequencies compared to a Phase-Locked Loop (PLL).

Figure 3:
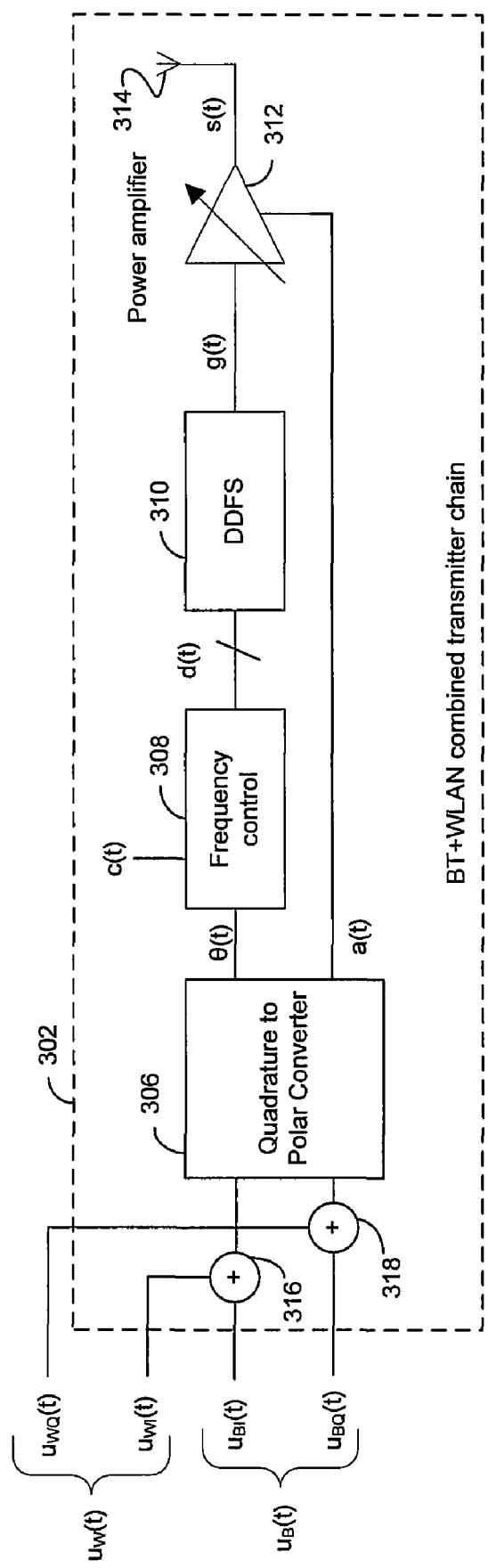
FIG. 3 is a block diagram illustrating an exemplary multisystem polar transmission system using a single transmitter chain, in accordance with an embodiment of the invention.

FIG. 3 is a block diagram illustrating an exemplary multisystem polar transmission system using a single transmitter chain, in accordance with an embodiment of the invention. Referring to FIG. 3, there is shown a multisystem polar transmitter chain 302, comprising a Quadrature-to-Polar (Q2P) converter 306, a frequency control block 308, a DDFS 310, a power amplifier 312 and an antenna 314. There is also shown a WLAN complex envelope signal $u_W(t)=u_{WI}(t)+j\ u_{WQ}(t)$, comprising an inphase component $u_{WI}(t)$ and a quadrature component $u_{WQ}(t)$, a BT complex envelope signal $u_B(t)=u_{BI}(t)+j\ u_{BQ}(t)$, comprising an inphase component $u_{BI}(t)$ and a quadrature component $u_{BQ}(t)$, a phase $\theta(t)$, an amplitude $a(t)$, a frequency control signal $c(t)$, a digital DDFS control signal $d(t)$, a DDFS output signal $g(t)$, and a transmit signal $s(t)$.

Some multisystem communication systems may be operated over the same antenna 314 if their operation frequencies are similar and/or the antenna may support a large frequency range. In these instances, it may be possible to combine multiple transmission signals and use one transmitter chain for RF modulation. The number of complex envelope signals that may be combined may be arbitrary, as may be the technologies that may be combined.

In order to use a multisystem polar transmitter 302 with multiple input signals, the inphase and quadrature components of a BT signal, for example, may be added to the inphase and quadrature components of a WLAN signal, for example. Hence, $$u_B(t)+u_W(t)=\underbrace{(u_{BI}(t)+u_{WI}(t))}_{u_I(t)}+j\underbrace{(u_{BQ}(t)+u_{WQ}(t))}_{u_Q(t)}$$

where the combined inphase component $u_I(t)$ and the combined quadrature component $u_Q(t)$ may be fed to the Q2P converter 306. The other functional blocks of the multisystem polar transmitter chain 302 may be similar to the WLAN transmitter chain 202, as described for FIG. 2. Functional blocks 306, 308, 310, 312 and 314 may correspond to functional blocks 206, 208, 210, 212 and 214 illustrated in FIG. 2.

In accordance with an embodiment of the invention, a method and system for a Multisystem Polar Transmitter may include in a single integrated circuit 200 comprising one or more Direct Digital Frequency Synthesizer (DDFS) 210 and 220 and one or more circuits that processes one or more signals compliant with at least a first wireless protocol and a second wireless protocol for transmission, may generate a plurality of signals compliant with at least the first wireless protocol and the second wireless protocol, wherein at least one of the signals is polar modulated using the DDFS 210 and 220, respectively. This may be depicted in FIG. 2. One or more circuits may comprise a plurality of wireless transmitters 202 and 204. The plurality of wireless transmitters may comprise a Bluetooth® transmitter 204 and a Wireless LAN transmitter 202. In another embodiment of the invention, a plurality of baseband signals compliant with the first and second protocol, respectively, may be combined, as illustrated in FIG. 3. The first protocol may be Bluetooth® and the second protocol may be Wireless LAN. The combined plurality of baseband signals may be modulated via a single wireless transmitter 302 on the integrated circuit. The phase and frequency for polar modulation may be adjusted using the DDFS 310, while the amplitude for polar modulation may be adjusted using a variable-gain power amplifier 312, as illustrated in FIG. 3.

Another embodiment of the invention may provide a machine-readable storage, having stored thereon, a computer program having at least one code section executable by a machine, thereby causing the machine to perform the steps as described above for a Method and System for a Multisystem Polar Transmitter.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
in a single integrated circuit comprising one or more Direct Digital Frequency Synthesizers (DDFS):
generating an in-phase component of a composite baseband signal by combining an in-phase component of a first baseband signal and an in-phase component of a second baseband signal;
generating a quadrature-phase component of said composite baseband signal by combining a quadrature-phase component of said first baseband signal and a quadrature-phase component of said second baseband signal;
generating a phase signal and an amplitude signal from said composite baseband signal; and
phase-modulating a carrier signal by controlling said DDFS based on said phase signal, wherein:
said first baseband signal is compliant with at least a first wireless protocol; and
said second baseband signal is compliant with at least a second wireless protocol.

2. The method according to claim 1, wherein said single integrated circuit comprises a plurality of wireless transmitters.

3. The method according to claim 2, wherein said plurality of wireless transmitters comprise a Bluetooth® transmitter and a Wireless LAN transmitter.

4. The method according to claim 1, wherein said first wireless protocol is a Bluetooth® protocol.

5. The method according to claim 1, wherein said second wireless protocol is a Wireless LAN protocol.

6. The method according to claim 1, wherein said single integrated circuit comprises a frequency control module which generates a signal for said controlling of said DDFS based on said phase signal and based on a frequency of said carrier signal.

7. The method according to claim 1, comprising controlling gain of a variable-gain power amplifier using said amplitude signal.

8. A system comprising:
a single integrated circuit comprising one or more Direct Digital Frequency Synthesizer (DDFS), said single integrated circuit being operable to:
generate an in-phase component of a composite baseband signal by combining an in-phase component of a first baseband signal and an in-phase component of a second baseband signal;
generate a quadrature-phase component of said composite baseband signal by combining a quadrature-phase component of said first baseband signal and a quadrature-phase component of said second baseband signal;
generate a phase signal and an amplitude signal from said composite baseband signal; and
phase-modulate a carrier signal by controlling said DDFS based on said phase signal, wherein:
said first baseband signal is compliant with at least a first wireless protocol; and
said second baseband signal is compliant with at least a second wireless protocol.

9. The system according to claim 8, wherein said single integrated circuit comprises a plurality of wireless transmitters.

10. The system according to claim 9, wherein said plurality of wireless transmitters comprise a Bluetooth® transmitter and a Wireless LAN transmitter.

11. The system according to claim 8, wherein said first wireless protocol is a Bluetooth® protocol.

12. The system according to claim 8, wherein said second wireless protocol is a Wireless LAN protocol.

13. The system according to claim 8, wherein said single integrated circuit comprises a frequency control module which generates a signal for said controlling of said DDFS based on said phase signal and based on a frequency of said carrier signal.

14. The system according to claim 8, wherein said single integrated circuit comprises a variable gain amplifier, and said single integrated circuit is operable to control a gain of said variable-gain power amplifier using said amplitude signal.

15. A non-transitory machine-readable storage having stored thereon, a computer program having at least one code section for processing communication signals, the at least one code section being executable by a machine for causing the machine to perform steps comprising:
in a single integrated circuit comprising one or more Direct Digital Frequency Synthesizer (DDFS):
generating an in-phase component of a composite baseband signal by combining an in-phase component of a first baseband signal and an in-phase component of a second baseband signal;
generating a quadrature-phase component of said composite baseband signal by combining a quadrature-phase component of said first baseband signal and a quadrature-phase component of said second baseband signal;
generating a phase signal and an amplitude signal from said composite baseband signal; and
controlling said DDFS based on said phase signal to phase-modulate a carrier signal, wherein
said first baseband signal is compliant with at least a first wireless protocol; and
said second baseband signal is compliant with at least a second wireless protocol.

16. The machine-readable storage according to claim 15, wherein said single integrated circuit comprises a plurality of wireless transmitters.

17. The non-transitory machine-readable storage according to claim 16, wherein said plurality of wireless transmitters comprise a Bluetooth® transmitter and a Wireless LAN transmitter.

18. The non-transitory machine-readable storage according to claim 15, wherein said first wireless protocol is a Bluetooth® protocol.

19. The non-transitory machine-readable storage according to claim 15, wherein said second wireless protocol is a Wireless LAN protocol.

20. The non-transitory machine-readable storage according to claim 15, wherein said single integrated circuit comprises a frequency control module which generates a signal for said controlling of said DDFS based on said phase and based on a frequency of said carrier signal.

21. The non-transitory machine-readable storage according to claim 15 wherein the at least one code section enables controlling gain of a variable-gain power amplifier using said amplitude signal.

* * * * *